US008582911B2

(12) United States Patent
Kim et al.

(10) Patent No.: US 8,582,911 B2
(45) Date of Patent: Nov. 12, 2013

(54) IMAGE RESTORATION DEVICE, IMAGE RESTORATION METHOD AND IMAGE RESTORATION SYSTEM

(75) Inventors: Tae-chan Kim, Yongin-si (KR); Joon-ki Paik, Seoul (KR); Sang-hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 316 days.

(21) Appl. No.: 13/045,127

(22) Filed: Mar. 10, 2011

(65) Prior Publication Data

US 2011/0222764 A1 Sep. 15, 2011

(30) Foreign Application Priority Data

Mar. 12, 2010 (KR) ........................ 10-2010-0022424

(51) Int. Cl.
*G06K 9/40* (2006.01)
(52) U.S. Cl.
USPC ........................................................ 382/260
(58) Field of Classification Search
USPC .................. 382/260; 704/256.7, E15.034
See application file for complete search history.

(56) References Cited

U.S. PATENT DOCUMENTS

| 6,166,853 | A | * | 12/2000 | Sapia et al. | 359/559 |
| 6,285,799 | B1 | * | 9/2001 | Dance et al. | 382/261 |
| 6,370,279 | B1 | * | 4/2002 | Paik | 382/268 |
| 2006/0066736 | A1 | | 3/2006 | Tsuruoka | |
| 2008/0043117 | A1 | | 2/2008 | Kim et al. | |
| 2008/0049112 | A1 | * | 2/2008 | Lee | 348/222.1 |
| 2008/0101664 | A1 | * | 5/2008 | Perez | 382/125 |

FOREIGN PATENT DOCUMENTS

| JP | 2006-238060 A | 9/2006 |
| KR | 10 2005-0114411 A | 12/2005 |
| KR | 10 2006-0016648 A | 2/2006 |

* cited by examiner

*Primary Examiner* — Gregory F Cunningham
(74) *Attorney, Agent, or Firm* — Lee & Morse, P.C.

(57) ABSTRACT

An image restoration device, an image restoration method, and an image restoration system are provided. The image restoration device includes a point spread function estimation unit, and an image restoration filter unit. The point spread function estimation unit receives an image signal and estimates a Point Spread Function (PSF) from the received image signal. The image restoration filter unit receives the image signal and the PSF, generates an image restoration filter coefficient from the PSF, and filters the image signal according to the image restoration filter coefficient to output the filtered image signal.

28 Claims, 9 Drawing Sheets

| 0.0008 | 0 | 0.0009 | 0 | 0.0064 | 0 | 0.0009 | 0 | 0.0008 |
|---|---|---|---|---|---|---|---|---|
| 0 | 0 | 0 | 0 | 0 | 0 | 0 | 0 | 0 |
| 0.0009 | 0 | -0.0364 | 0 | -0.2033 | 0 | -0.0364 | 0 | 0.0009 |
| 0 | 0 | 0 | 0 | 0 | 0 | 0 | 0 | 0 |
| 0.0064 | 0 | -0.2033 | 0 | 1.9224 | 0 | -0.2033 | 0 | 0.0064 |
| 0 | 0 | 0 | 0 | 0 | 0 | 0 | 0 | 0 |
| 0.0009 | 0 | -0.0364 | 0 | -0.2033 | 0 | -0.0364 | 0 | 0.0009 |
| 0 | 0 | 0 | 0 | 0 | 0 | 0 | 0 | 0 |
| 0.0008 | 0 | 0.0009 | 0 | 0.0064 | 0 | 0.0009 | 0 | 0.0008 |

FIG. 10B

| 0.0004 | 0 | -0.0008 | 0 | 0.0040 | 0 | -0.0008 | 0 | 0.0004 |
|---|---|---|---|---|---|---|---|---|
| 0 | -0.0022 | 0 | 0.0084 | 0 | 0.0084 | 0 | -0.0022 | 0 |
| -0.0008 | 0 | 0.0170 | 0 | -0.0767 | 0 | 0.0170 | 0 | -0.0008 |
| 0 | 0.0084 | 0 | -0.2262 | 0 | -0.2262 | 0 | 0.0084 | 0 |
| 0.0040 | 0 | -0.0767 | 0 | 2.0742 | 0 | -0.0767 | 0 | 0.0040 |
| 0 | 0.0084 | 0 | -0.2262 | 0 | -0.2262 | 0 | 0.0084 | 0 |
| -0.0008 | 0 | 0.0170 | 0 | -0.0767 | 0 | 0.0170 | 0 | -0.0008 |
| 0 | -0.0022 | 0 | 0.0084 | 0 | 0.0084 | 0 | -0.0022 | 0 |
| 0.0004 | 0 | -0.0008 | 0 | 0.0040 | 0 | -0.0008 | 0 | 0.0004 |

FIG. 10C

| -0.0009 | 0 | 0.0011 | 0 | 0.0017 | 0 | 0.0011 | 0 | -0.0009 |
|---|---|---|---|---|---|---|---|---|
| 0 | 0 | 0 | 0 | 0 | 0 | 0 | 0 | 0 |
| 0.0011 | 0 | -0.0373 | 0 | -0.1598 | 0 | -0.0373 | 0 | 0.0011 |
| 0 | 0 | 0 | 0 | 0 | 0 | 0 | 0 | 0 |
| 0.0017 | 0 | -0.1598 | 0 | 1.7763 | 0 | -0.1598 | 0 | 0.0017 |
| 0 | 0 | 0 | 0 | 0 | 0 | 0 | 0 | 0 |
| 0.0011 | 0 | -0.0373 | 0 | -0.1598 | 0 | -0.0373 | 0 | 0.0011 |
| 0 | 0 | 0 | 0 | 0 | 0 | 0 | 0 | 0 |
| -0.0009 | 0 | 0.0011 | 0 | 0.0017 | 0 | 0.0011 | 0 | -0.0009 |

IMAGE RESTORATION DEVICE, IMAGE RESTORATION METHOD AND IMAGE RESTORATION SYSTEM

BACKGROUND

1. Field

Embodiments relate to an image restoration device, an image restoration method, and an image restoration system, and more particularly, an image restoration device, an image restoration method, and an image restoration system, which may multiply a Constrained Least Square (CLS) filter coefficient calculated from a Point Spread Function (PSF) by a window function to generate an image restoration filter coefficient.

2. Description of the Related Art

For digital image restoration of images output from an image sensing device, a Constrained Least Square (CLS) filter may be used. However, since a conventional CLS filter requires a Fourier transform of an entire input image, there are limitations in that the CLS filter has a complex structure and requires a large amount of processing capacity and power.

SUMMARY

Embodiments are therefore directed to an image restoration device, an image restoration method, and an image restoration system, which substantially overcome one or more of the problems due to the limitations and disadvantages of the related art.

It is therefore a feature of an embodiment to provide an image restoration device, an image restoration method, and an image restoration system which may multiply a Constrained Least Square (CLS) filter coefficient calculated from a Point Spread Function (PSF) by a window function to generate an image restoration filter coefficient.

According to an aspect of the inventive concept, there is provided an image restoration device including: a Point Spread Function (PSF) estimation unit receiving an image signal and estimating a PSF from the received image signal; and an image restoration filter unit receiving the image signal and the PSF, generating an image restoration filter coefficient from the PSF, and filtering the image signal according to the image restoration filter coefficient to output the filtered image signal.

The image restoration filter unit may include: a filter coefficient generation unit receiving the PSF and generating the image restoration filter coefficient from the received PSF to output the generated image restoration filter coefficient; and a Finite Impulse Response (FIR) filter receiving the image signal and the image restoration filter coefficient, performing convolution on the image signal and the image restoration filter coefficient and outputting a convolution result.

The filter coefficient generation unit may include: an image restoration function generation unit generating an image restoration function from the PSF; and a filter coefficient extraction unit receiving the image restoration function, calculating a Constrained Least Square (CLS) filter coefficient from the image restoration function, and multiplying the CLS filter coefficient by a window function to generate the image restoration filter coefficient.

The filter coefficient generation unit may further include a filter coefficient storage unit receiving the image restoration filter coefficient from the filter coefficient extraction unit, and storing the image restoration filter coefficient.

The image restoration function generation unit may generate the image restoration function R according to the following Equation:

$$R = \frac{H^*}{|H|^2 + \lambda |C|^2}$$

where H represents a PSF, H* represents a complex conjugate of the PSF, $\lambda$ represents a regularization parameter, and C represents a transfer function of a high pass filter.

The window function may include one of a rectangular window function, a Gaussian window function, and a raised cosine window function.

The image restoration device may further include a weight value calculation unit receiving the image signal and analyzing the image signal to generate and output a weight value coefficient.

The image restoration device may further include an image mixing unit receiving the image signal, the filtered image signal, and the weight value coefficient, and calculating a weighted average of the image signal and the filtered image signal according to the weight value coefficient to output the weighted average as a restored image signal.

According to another aspect of the inventive concept, there is provided an image restoration method including: receiving an image signal to estimate a PSF from the received image signal; receiving the image signal and the PSF to generate an image restoration filter coefficient from the PSF; and filtering the image signal according to the image restoration filter coefficient to output the filtered image signal.

The generation of an image restoration filter coefficient may include generating an IRF from the PSF, receiving the IRF and calculating a CLS filter coefficient from the IRF, and multiplying the CLS filter coefficient by a window function to generate the image restoration filter coefficient.

The window function may include one of a rectangular window function, a Gaussian window function, and a raised cosine window function.

The filtering of the image signal to output the filtered image signal may include a FIR filtering receiving the image signal and the image restoration filter coefficient and performing convolution on the image signal and the image restoration filter coefficient to output the convolution result.

The image restoration method may further include receiving the image signal and analyzing the image signal to generate and output a weight value coefficient, and receiving the image signal, the filtered image signal, and the weight value coefficient and calculating a weighted average of the image signal and the filtered image signal according to the weight value coefficient to output the weighted average as an restored image signal.

According to still another aspect of the inventive concept, there is provided an image restoration system including: an image sensor capturing an image of a subject to generate an image signal and outputting the image signal; and an image restoration device receiving the image signal from the image sensor and restoring the received image signal to output the restored image signal, wherein the image restoration device includes: a PSF estimation unit receiving the image signal and estimating a PSF from the received image signal; and an image restoration filter unit receiving the image signal and the PSF, generating an image restoration filter coefficient from the PSF, and filtering the image signal according to the image restoration filter coefficient to output the filtered image signal.

The image restoration filter unit may include: a filter coefficient generation unit receiving the PSF and generating the image restoration filter coefficient from the received PSF to output the generated image restoration filter coefficient; and a FIR filter receiving the image signal and the image restoration filter coefficient, performing convolution on the image signal and the image restoration filter coefficient and outputting a convolution result.

The filter coefficient generation unit may include: an image restoration function generation unit generating an image restoration function from the PSF; and a filter coefficient extraction unit receiving the image restoration function, calculating a CLS filter coefficient from the image restoration function, and multiplying the CLS filter coefficient by a window function to generate the image restoration filter coefficient.

The window function may include one of a rectangular window function, a Gaussian window function, and a raised cosine window function.

The image restoration system may further include a weight value calculation unit receiving the image signal and analyzing the image signal to generate and output a weight value coefficient, and an image mixing unit receiving the image signal, the filtered image signal, and the weight value coefficient, and calculating a weighted average of the image signal and the filtered image signal according to the weight value coefficient to output the weighted average as an restored image signal.

The image restoration system may further include an image interpolation unit performing image interpolation on the restored image signal output from the image restoration device and transforming the restored image signal to an RGB domain.

According to even another aspect of the inventive concept, there is provided an image restoration system including: an image sensor capturing an image of a subject to generate an image signal and outputting the image signal; an image interpolation unit performing image interpolation on the image signal output from the image sensor and transform the image signal to an RGB domain; and an image restoration device receiving the image signal transformed to the RGB domain from the image interpolation unit and restoring the transformed image signal to output the restored image signal, wherein the image restoration device includes: a PSF estimation unit receiving the image signal and estimating a PSF from the received image signal; and an image restoration filter unit receiving the image signal and the PSF, generating an image restoration filter coefficient from the PSF, and filtering the image signal according to the image restoration filter coefficient to output the filtered image signal.

BRIEF DESCRIPTION OF THE DRAWINGS

The above and other features and advantages will become more apparent to those of ordinary skill in the art by describing in detail exemplary embodiments with reference to the attached drawings, in which:

FIG. 9 illustrates a diagram of an image restoration filter coefficient of an RGB domain according to an embodiment of the inventive concept;

FIG. 10 illustrates a diagram of an image restoration filter coefficient of a Bayer domain according to an embodiment of the inventive concept;

DETAILED DESCRIPTION

Korean Patent Application No. 10-2010-0022424, filed on Mar. 12, 2010, in the Korean Intellectual Property Office, and entitled: "Image Restoration Device, Image Restoration Method and Image Restoration System," is incorporated by reference herein in its entirety.

Hereinafter, exemplary embodiments will be described in detail with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
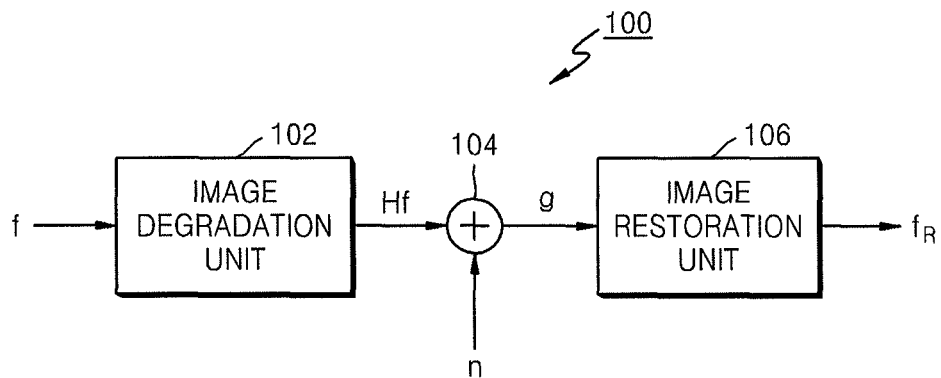
FIG. 1 illustrates a diagram of a model showing an image degradation process and a restoration process.

FIG. 1 is a diagram illustrating a model 100 showing an image degradation process and a restoration process. As shown in FIG. 1, the model 100 may include an image degradation unit 102, an adder 104, and an image restoration unit 106.

Referring to FIG. 1, the image degradation unit 102 may receive an original image f, and output an image Hf deteriorated according to a Point Spread Function (PSF). Here, the PSF represents a light distribution obtained from a plane on which an image is projected when a point input passes an optical system.

The adder 104 may output a degraded image g by summing an output image Hf and noise n. The adder 104 may be a component modeling a phenomenon that noise generated in a sensor is added to an image Hf output from the image degradation unit 102 or sampling degradation of a Color Filter Array (CFA).

The degraded image g may be expressed as the following Equation 1:

$$g = Hf + n \qquad (1)$$

The image restoration unit 106 may generate a restored image $f_R$ like the following Equation 2 by receiving the degraded image g and performing an image restoration using information of the PSF H:

$$f_R = Rg \qquad (2)$$

Here, R may represent an image restoration function of modelling an image restoration processing of the image restoration unit 106. The image restoration function R may be estimated from the PSF H.

Figure 2:
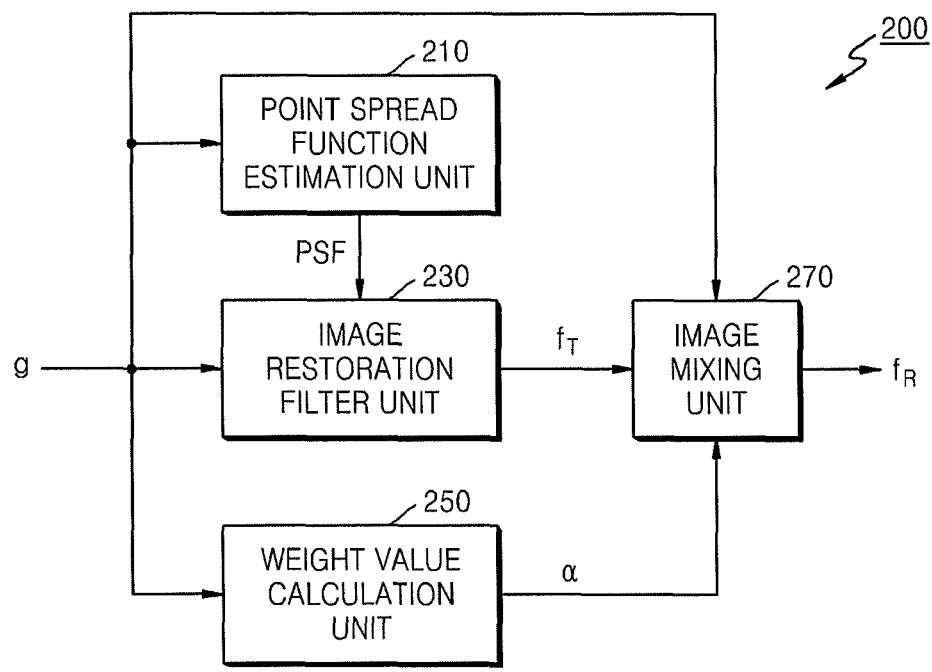
FIG. 2 illustrates a diagram of an image restoration device according to an embodiment of the inventive concept.

FIG. 2 is a diagram illustrating an image restoration device 200 according to an embodiment of the inventive concept. The image restoration device 200 may correspond to the image restoration unit 106 shown in FIG. 1.

Referring to FIG. 2, the image restoration device 200 may output a restored image signal $f_R$ by receiving an image signal g from the outside and performing an image restoration on the image signal g. Here, the image signal g may be an image signal corresponding to the degraded image g shown in FIG. 1.

As shown in FIG. 2, the image restoration device 200 may include a PSF estimation unit 210 and an image restoration filter unit 230. Also, the image restoration device 200 may further include a weight value calculation unit 250 and an image mixing unit 270.

The PSF estimation unit 210 may receive an image signal g from the outside and estimate a PSF from the received image signal g. Since a method of estimating the PSF from the received image signal by the PSF estimation unit 210 is well known to those skilled in the art, a detailed description thereof will be omitted herein. For example, a method of estimating a PSF from an image signal is disclosed in Korean Patent Publication No. 10-2007-0092357, which is hereby incorporated by reference.

The image restoration filter unit 230 may receive the image signal g from the outside, and may receive a PSF from the PSF estimation unit 210. The image restoration filter unit 230 may generate an image restoration filter coefficient from the PSF and filter the image signal g according to the generated image restoration filter coefficient to output the filtered image signal $f_T$ to the image mixing unit 270.

The weight value calculation unit 250 may receive the image signal g and analyze the received image signal g to generate a weight value coefficient $\alpha$. The weight value calculation unit 250 may output the generated weight value coefficient $\alpha$ to the image mixing unit 270. The weight value coefficient $\alpha$ may be a coefficient for calculating a weighted average of the image signal g and the filtered image signal $f_T$ at the image mixing unit 270. The weight value coefficient $\alpha$ output from the weight value calculation unit 250 may range from about 0 to about 1 ($0 \le \alpha \le 1$).

The image mixing unit 270 may receive the image signal g, the filtered image signal $f_T$, and the weight value coefficient $\alpha$, and calculate the weighted average of the image signal g and the filtered image signal $f_T$ according to the weight value coefficient $\alpha$. The image mixing unit 270 may output the calculated weight average to the outside of the image restoration device 200 as a restored image signal $f_R$.

A method of mixing the image signal g and the filtered image signal $f_T$ according to the weight value coefficient $\alpha$ may be expressed as the following Equation 3:

$$f_R = \alpha g + (1-\alpha) f_T \qquad (3)$$

As shown in Equation 3, the restored image signal $f_R$ is a weighted average of the image signal g and the filtered image signal $f_T$. Here, as the weight value coefficient $\alpha$ gets closer to 0, the value of the restored image signal $f_R$ may get closer to the filtered image signal $f_T$. On the other hand, as the weight value coefficient $\alpha$ gets closer to 1, the value of the restored image signal $f_R$ may get closer to the image signal g. That is, a mixing ratio of the image signal g and the filtered image signal $f_T$ may be determined according to the weight value coefficient $\alpha$, thereby controlling noise of the restored image signal $f_R$.

Figure 3:
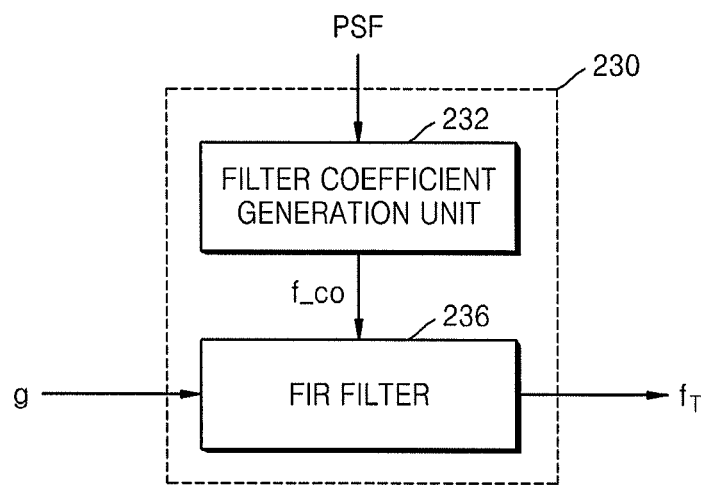
FIG. 3 illustrates a diagram of an image restoration filter unit according to an embodiment of the inventive concept.

FIG. 3 is a diagram illustrating the image restoration filter unit 230 according to an embodiment of the inventive concept. The image restoration filter unit 230 may serve as the image restoration filter unit 230 shown in FIG. 2.

Referring to FIG. 3, the image restoration filter unit 230 may include a filter coefficient generation unit 232 and a Finite Impulse Response (FIR) filter 236.

The filter coefficient generation unit 232 may receive a PSF from the PSF estimation unit 210, and generate an image restoration filter coefficient f_co from the received PSF. The filter coefficient generation unit 232 may output the generated image restoration filter coefficient f_co to the FIR filter 236.

The FIR filter 236 may receive an image signal g from the outside, and receive the image restoration filter coefficient f_co from the filter coefficient generation unit 232. The FIR filter 236 may perform convolution on the image signal g and the image restoration filter coefficient f_co to output the convolution result as a filtered image signal $f_T$. The FIR filter may have an FIR structure, the characteristics and general implementation method of which are well known to those skilled in the art.

Figure 4:
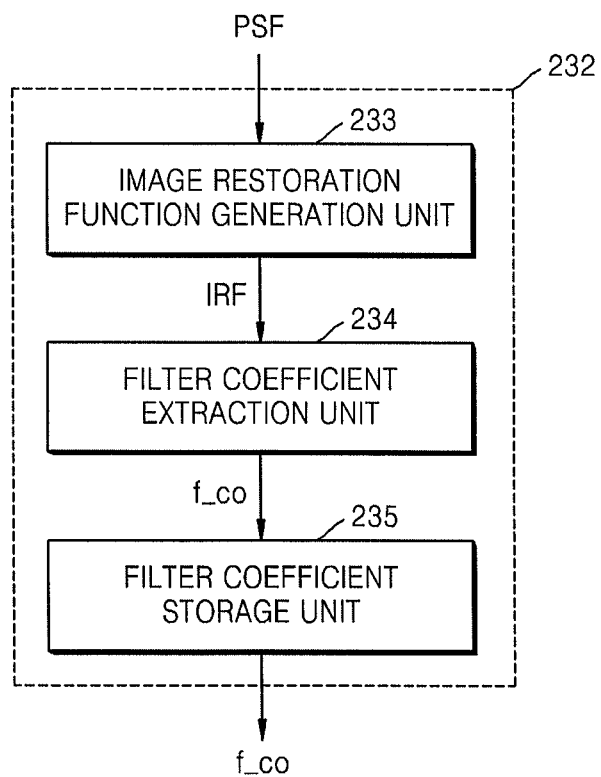
FIG. 4 illustrates a diagram of a filter coefficient generating unit according to an embodiment of the inventive concept.

FIG. 4 is a diagram illustrating the filter coefficient generation unit 232 according to an embodiment of the inventive concept. The filter coefficient generation unit 232 may serve as the filter coefficient generation unit 232 shown in FIG. 3.

Referring to FIG. 4, the filter coefficient generation unit 232 may include an image restoration function generation unit 233 and a filter coefficient extraction unit 234. Also, the filter coefficient generation unit 232 may further include a filter coefficient storage unit 235.

The image restoration function generation unit 233 may generate an Image Restoration Function (IRF) using the PSF received from the PSF estimation unit 210, and then output the generated IRF to the filter coefficient extraction unit 234. The IRF may be a transfer function of a Constrained Least Square (CLS) filter.

The transfer function of the CLS filter may be expressed as the following Equation 4:

$$R = \frac{H^*}{|H|^2 + \lambda |C|^2} \qquad (4)$$

Here, R represents a transfer function of a CLS filter, H represents a PSF, and H* represents a complex conjugate of the PSF. Also, $\lambda$ represents a Lagrange multiplier, serving as a regularization parameter for controlling a relative amount of data fidelity and smoothing functions. C represents a transfer function of a high pass filter. For example, a process of calculating the transfer function R of the CLS filter from the PSF H is disclosed in Korean Patent Registration No. 10-0247938, which is hereby incorporated by reference, a detailed description of which will be omitted herein.

Referring again to FIG. 4, the filter coefficient extraction unit 234 may calculate the CLS filter coefficient from the IRF received from the IRF generation unit 233, i.e., the transfer function R of the CLS filter. The calculating of the CLS filter coefficient from the transfer function R of the CLS filter is well known to those skilled in the art. Accordingly, a detailed description thereof will be omitted herein.

In order to implement a CLS filter using the CLS filter coefficient, a FIR filter having the same size as the whole image signal needs to be used. For example, if an input image signal g is an image signal having a size of 256×256, a FIR filter having a size of 256×256 has to be used to restore the image signal g to a CLS filter. Thus, in order to restore the image signal having the size of 256×256, a CLS filter coefficient having a size of 256×256 needs to be input into the FIR filter having the size of 256×256. Here, 256×256 may mean 256×256 pixels.

However, the main energy of the CLS filter is concentrated on the central portion (e.g., around the pixel 128 in the case of a filter having a size of 256×256) of the filter. Accordingly, even when a CLS filter coefficient having a size of 256×256 is multiplied by a window function having a size of 9×9 to generate an image restoration filter coefficient f_co having a size of 9×9 and then a FIR filter having a size of 9×9 is implemented using the image restoration filter coefficient f_co, a filtering result similar to that of the FIR filter having the size of 256×256 may be obtained.

According to such a principle, the filter coefficient extraction unit 234 of FIG. 4 may generate and output the image restoration filter coefficient f_co by multiplying the CLS filter coefficient by the window function having a size of 9×9.

Here, the window function multiplied by the CLS filter coefficient may include one of a rectangular window function, a Gaussian window function, and a raised cosine window function, but embodiments are not limited thereto. For example, the window function may be one of window functions known to those skilled in the art. Also, the window function may have various sizes other than the size of 9×9. The size of the window function may be determined according to the PSF and the transfer function of the CLS. A detailed description of an operation of the filter coefficient extraction unit 234 will be described in detail with reference to FIGS. 5 to 8.

The CLS filter coefficient and the image restoration filter coefficient f_co have been described as having sizes of 256×256 and 9×9, respectively, but embodiments of the inventive concept are not limited thereto. Accordingly, the sizes of the CLS filter coefficient and the image restoration filter coefficient f_co may be variously modified.

The filter coefficient storage unit 235 shown in FIG. 4 may receive the image restoration filter coefficient f_co from the filter coefficient extraction unit 234, and store the image restoration filter coefficient f_co. The image restoration filter coefficient f_co may be output to the outside after being stored in the filter coefficient storage unit 235, as shown in FIG. 4, but may also be directly output from the filter coefficient extraction unit 234 to the outside without being stored in the filter coefficient storage unit 235 unlike FIG. 4.

Figure 5:
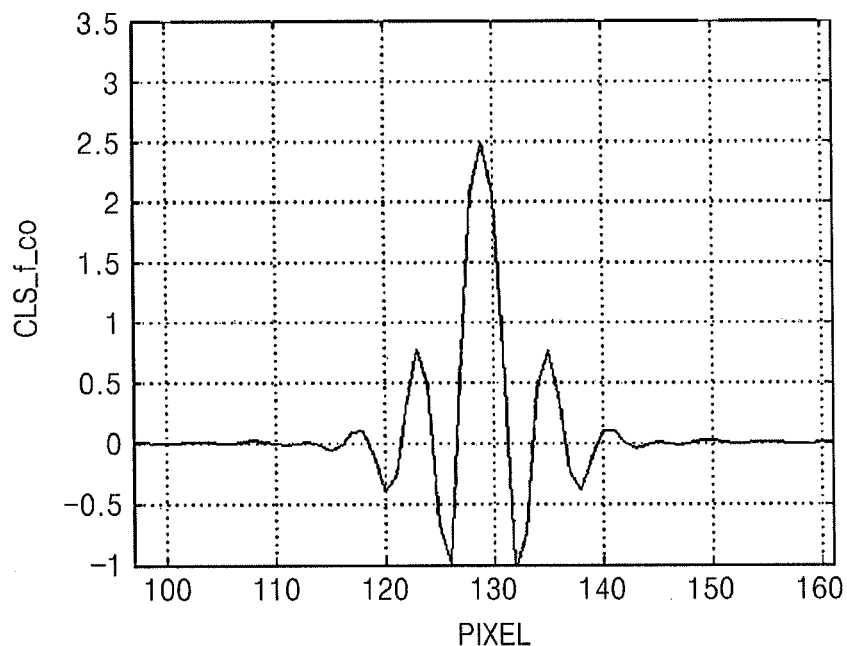
FIG. 5 illustrates a graph of a Constrained Least Square (CLS) filter coefficient having a size of 256×256 according to an embodiment of the inventive concept.

FIG. 5 is a graph illustrating a CLS filter coefficient having a size of 256×256, according to an embodiment of the inventive concept. Referring to FIG. 5, the horizontal axis represents the location of pixels, and the vertical axis represents values of the CLS filter coefficients CLS_f_co corresponding to the respective pixels. FIG. 5 is a magnified view of a central portion (around the pixel 128) of a filter. The CLS filter coefficient CLS_f_co shown in FIG. 5 has a size of 256×256.

Figure 6:
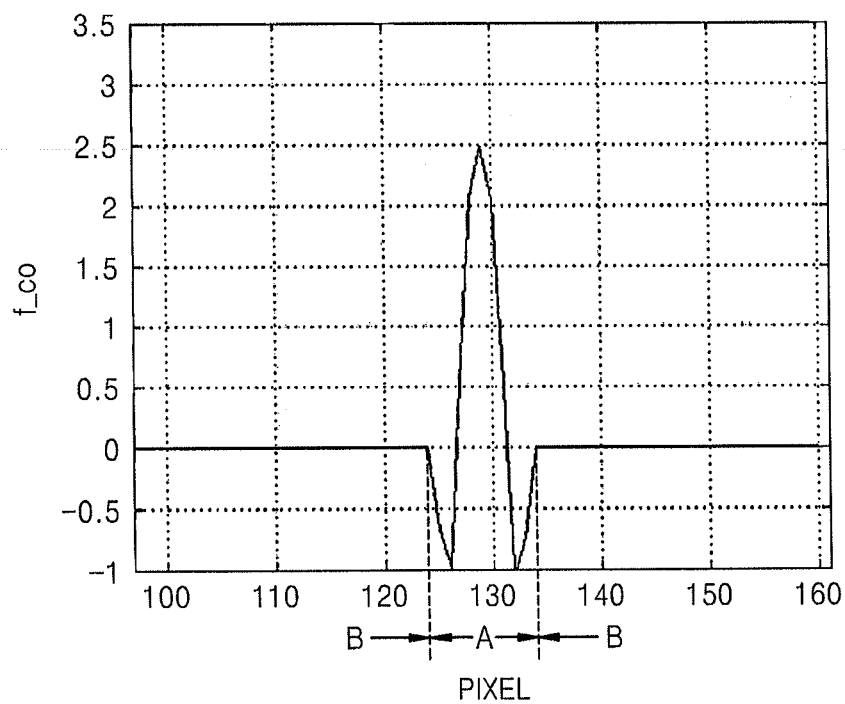
FIG. 6 illustrates a graph of an image restoration filter coefficient generated by multiplying a CLS filter coefficient shown in FIG. 5 by a rectangular window function of a 9×9 size.

FIG. 6 is a graph illustrating an image restoration filter coefficient generated by multiplying a CLS filter coefficient shown in FIG. 5 by a rectangular window function of a 9×9 size. Similarly to FIG. 5, the horizontal axis of FIG. 6 represents the location of pixels, and the vertical axis of FIG. 6 represents values of the image restoration filter coefficients f_co corresponding to the respective pixels.

Referring to FIG. 6, since the image restoration filter coefficient f_co of FIG. 6 is generated by multiplying a CLS filter coefficient of FIG. 5 by a rectangular window function of a 9×9 size, the image restoration filter coefficient f_co of a section A corresponding to nine pixels centered on the pixel 128 at the central portion of the filter may have the same values as the CLS filter coefficient CLS_f_co of FIG. 5, but all of the image restoration filter coefficients f_co of other portions B may be about 0.

Figure 7:
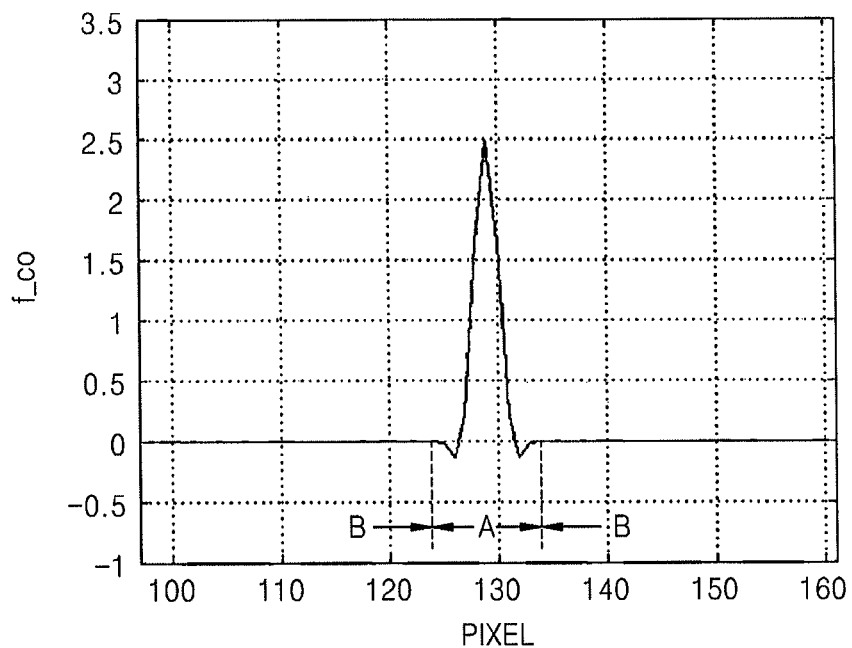
FIG. 7 illustrates a graph of an image restoration filter coefficient generated by multiplying a CLS filter coefficient shown in FIG. 5 by a Gaussian window function of a 9×9 size.

FIG. 7 is a graph illustrating an image restoration filter coefficient generated by multiplying a CLS filter coefficient shown in FIG. 5 by a Gaussian window function of a 9×9 size. Similarly to FIG. 6, the horizontal axis of FIG. 7 represents the location of pixels, and the vertical axis of FIG. 7 represents values of the image restoration filter coefficients f_co corresponding to the respective pixels.

The image restoration filter coefficient f_co of FIG. 7 may be generated by multiplying the CLS filter coefficient shown in FIG. 5 by the Gaussian window function of a 9×9 size. The Gaussian window function has the characteristic of its values exponentially decreasing away distant from the center value. Accordingly, the image restoration filter coefficient f_co of FIG. 7 may have smaller values than those of the CLS filter coefficient CLS f_co of FIG. 5 further from the central portion A of the filter. Similarly to FIG. 6, the image restoration filter coefficient f_co of other portions B, except for the central portion A of the filter, may be about 0.

For example, when the standard deviation of the Gaussian function is $\sigma$, a FIR filter may be implemented using the image restoration filter coefficient f_co generated by multiplying the CLS filter coefficient CLS_f_co by a Gaussian window function having a radius of about $3\sigma$. In this case, the FIR filter may include 99% or more of the total energy of the CLS filter. Accordingly, the size of the Gaussian window function may be properly selected by referring to this.

Figure 8:
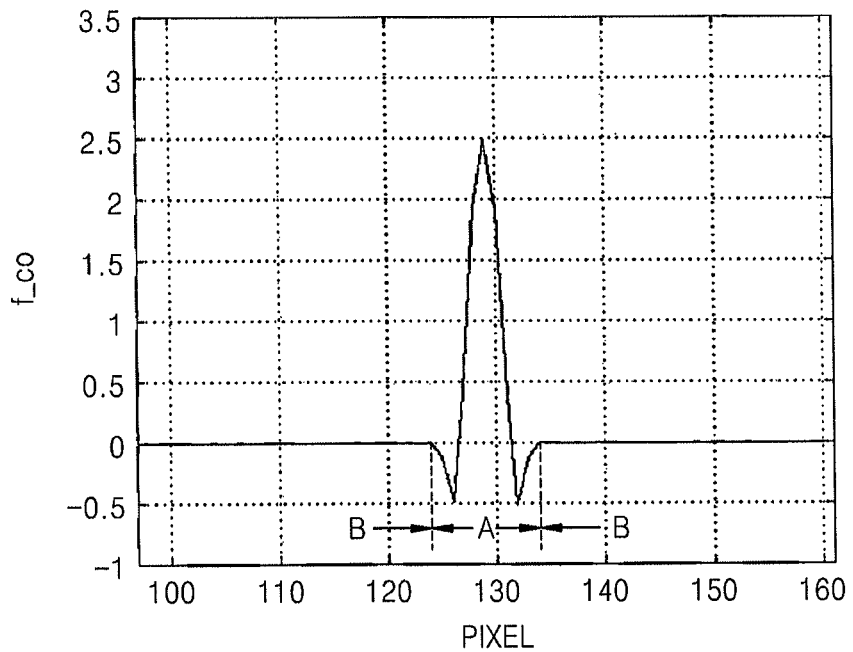
FIG. 8 illustrates a graph of an image restoration filter coefficient generated by multiplying a CLS filter coefficient shown in FIG. 5 by a raised cosine window function of a 9×9 Size.

FIG. 8 is a graph illustrating an image restoration filter coefficient generated by multiplying a CLS filter coefficient shown in FIG. 5 by a raised cosine window function of a 9×9 Size. Similarly to FIG. 6, the horizontal axis of FIG. 8 represents the location of pixels, and the vertical axis of FIG. 8 represents values of the image restoration filter coefficients f_co corresponding to the respective pixels.

Referring to FIG. 8, the image restoration filter coefficient f_co of FIG. 8 may have values similar to the image restoration filter coefficient f_co of FIG. 7. However, since the raised cosine window function does not have rapidly reduced values compared with the Gaussian window function further from the center value, the absolute values of the image restoration filter coefficient f_co shown in FIG. 8 may be greater than those of the image restoration filter coefficient f_co shown in FIG. 7.

All of the image restoration filter coefficients f_co shown in FIGS. 6 to 8 may have symmetrical characteristics about the center values. Thus, the FIR filter implemented according to the image restoration filter coefficient f_co may have the characteristics of a zero-phase delay or a constant-phase delay.

Figures 9A, 9B, 9C:
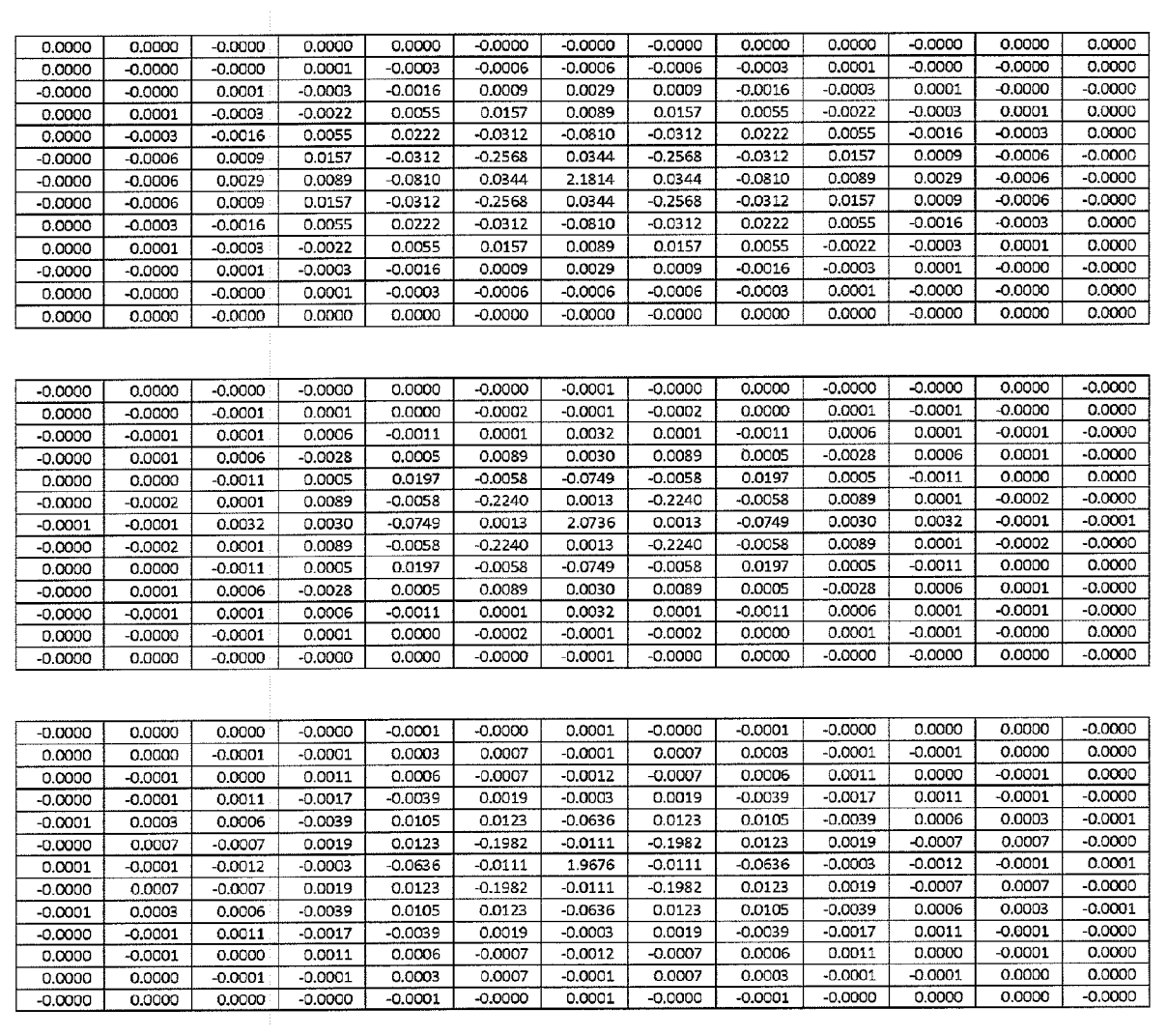

FIGS. 9A to 9C illustrate image restoration filter coefficients of an RGB domain according to an embodiment of the inventive concept. FIG. 9A illustrate image restoration filter coefficients for red, FIG. 9B illustrate image restoration filter coefficients for green, and FIG. 9C illustrate image restoration filter coefficients for blue. The image restoration filter coefficients of the RGB domain of FIGS. 9A to 9C may have a size of 13×13.

Referring to FIGS. 9A to 9C, the respective image restoration filter coefficients corresponding to RGB colors may have greater absolute values as they approach the center portion and may have absolute values closer to 0 as they become more distant from the center portion. It will be apparent to those skilled in the art that the image restoration filter coefficients of the RGB domain described in FIG. 9A to 9C are merely illustrative examples, and thus various modifications may be made.

FIGS. 10A to 10C illustrate image restoration filter coefficients of a Bayer domain according to an embodiment of the inventive concept. Similarly to FIGS. 9A to 9C, FIGS. 10A to 10C are image restoration filter coefficients that correspond to red, green, and blue, respectively. Image restoration filter coefficients of the Bayer domain of FIGS. 10A to 10C may have a size of 9×9.

The image restoration filter coefficients of the RGB domain of a 13×13 size shown in FIG. 9A to 9C may be transformed to the image restoration filter coefficients of the Bayer domain of a 9×9 size. Since the transform of the image restoration filter coefficients of the RGB domain to the image restoration filter coefficients of the Bayer domain through an image interpolation process is well known to those skilled in the art, a detailed description thereof will be omitted herein.

Figure 11:
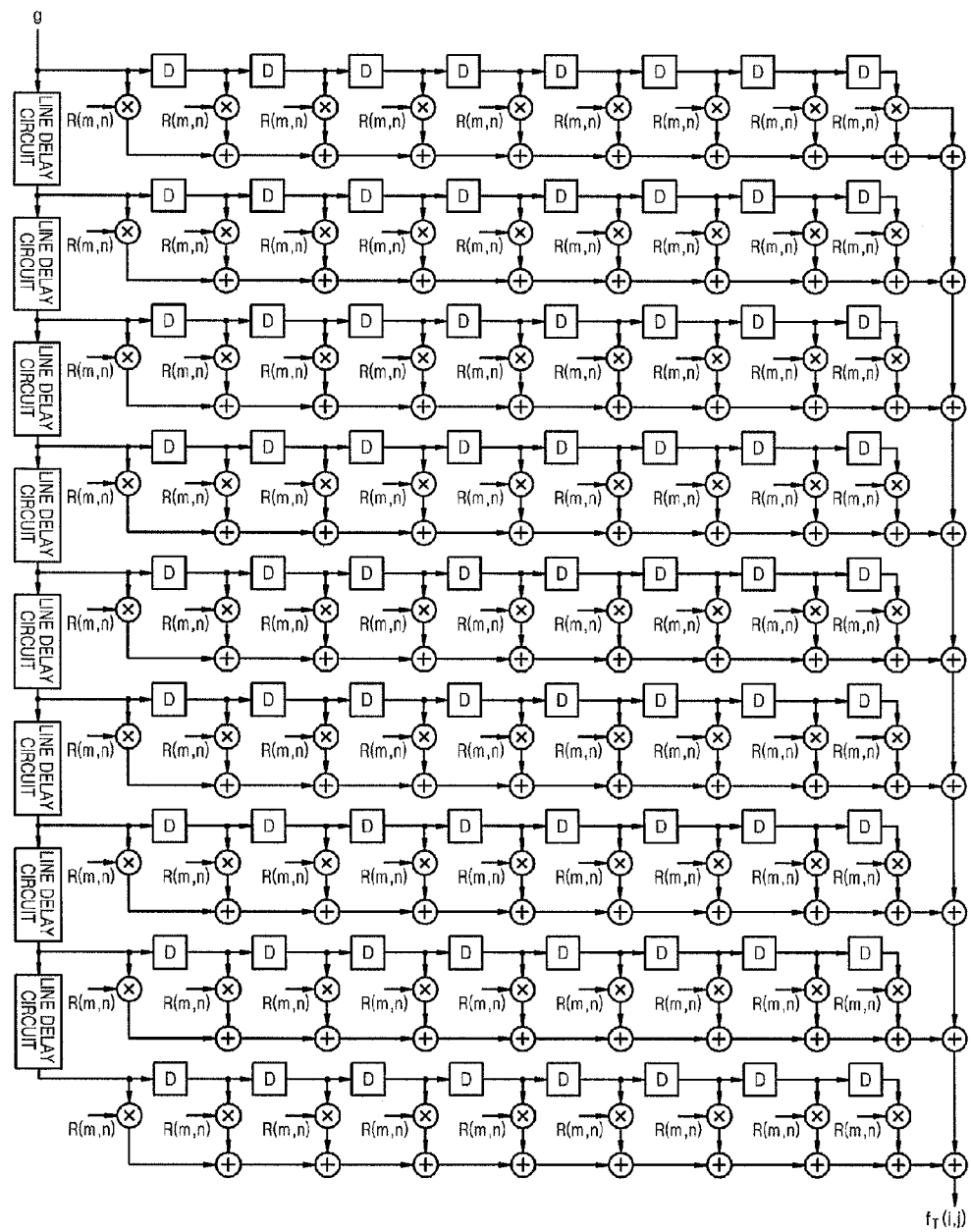
FIG. 11 illustrates a diagram of an FIR filter having a size of 9×9, according to an embodiment.

FIG. 11 is a diagram illustrating an FIR filter having a size of 9×9, according to an embodiment of the inventive concept. The FIR filter shown in FIG. 11 may serve as the FIR filter 236 shown in FIG. 3. Referring to FIG. 11, the FIR filter may include eight line delay circuits, 8×9 flip-flops D, and 9×9 multipliers and adders.

R (m,n) in FIG. 11 may be one of the image restoration filter coefficients of the Bayer domain shown in FIGS. 10A to 10C. The FIR filter of FIG. 11 may generate a filtered image signal $f_T(i,j)$ by multiplying image values of respective pixels of sequentially input image signals g by corresponding image restoration filter coefficients and adding up all of the multiplied results. That is, the FIR filter of FIG. 11 may generate the filtered image signal $f_T$ by performing convolution on the image signal g having a size of 9×9 and the image restoration filter coefficient having a size of 9×9.

The FIR filter of FIG. 11 may be implemented to have a smaller size than 9×9. That is, as shown in FIG. 10A to 10C, the image restoration filter coefficient of the Bayer domain may have a substantial value only at places determined according to the Bayer pattern, and may be 0 at other places. Accordingly, even when the image restoration filter coefficients of the Bayer domain having a size of 9×9 are used, a FIR filter having a smaller size than 9×9 may be used. That is, when the value of the image restoration filter coefficients of the Bayer domain is 0, the image value of a pixel does not have to be considered. Accordingly, the number of multipliers and adders provided in the FIR filter can be reduced.

The FIR filter shown in FIG. 11 may be implemented using the image restoration filter of the RGB domain shown in FIGS. 9A to 9C. In this case, R(m,n) may be one of the image restoration filter coefficients of the RGB domain shown in FIGS. 9A to 9C. The FIR filter may have a 13×13 size equal to that of the image restoration filter coefficient of the RGB domain.

As shown in FIG. 11, since the FIR filter provided in the image restoration device has a general FIR structure, modifications and improvements of the filter can be directly made without modifications of the hardware structure.

Figure 12:
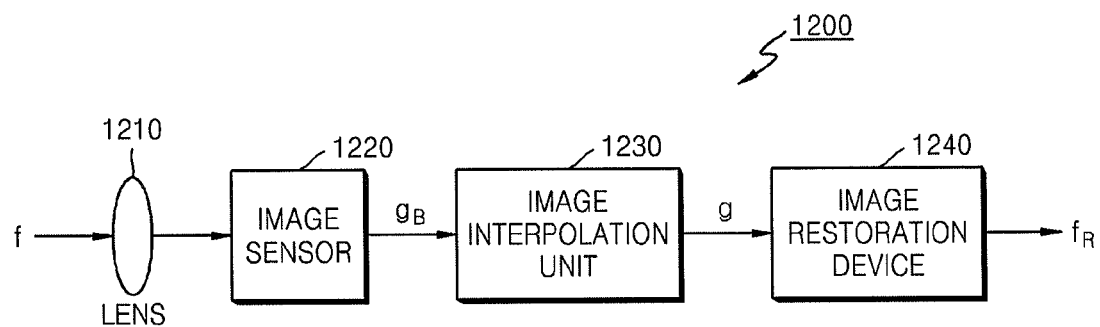
FIG. 12 illustrates a diagram of an image restoration system including an image restoration device, according to an embodiment of the inventive concept.

FIG. 12 is a diagram illustrating an image restoration system 1200 including an image restoration device 1240, according to an embodiment of the inventive concept. Referring to FIG. 12, the image restoration system 1200 may include an image sensor 1220, an image interpolation unit 1230, and the image restoration device 1240. Also, the image restoration system 1200 may further include a lens 1210.

Referring to FIG. 12, the image sensor 1220 may capture images of a subject (not shown) to generate an image signal $g_B$, and output the generated image signal $g_B$ to the image interpolation unit 1230. The image sensor 1220 may be implemented, for example, with CMOS Image Sensors (CISs) or Charge-Coupled Devices (CCDs). The pixel array of the image sensor 1220 may be an Active Pixel Sensor (APS) array in which more than one million pixels are arranged. The image sensor 1220 may capture images of the subject (not shown) to generate image signals consisting of R, G, B, by using photodiodes provided in each pixel of the APS array. Three types of color filters may be installed at the upper part of the respective pixels forming the APS array in a Bayer pattern to receive only specific colors of light. Accordingly, the image signal $g_B$ output from the image sensor 1220 of FIG. 12 may have a Bayer pattern.

The image interpolation unit 1230 may perform image interpolation on the received image signal $g_B$ to generate image signals g of the RGB domain, and may output the generated image signals g to the image restoration device 1240.

Referring to FIG. 12, since the image restoration device 1240 may receive the image signals g of the RGB domain from the image interpolation unit 1230, the filter coefficient generation unit 232 provided in the image restoration device 1240 may generate image restoration filter coefficients f_co of the RGB domain to output the image restoration filter coefficients f_co to the FIR filter 236. The image restoration device 1240 may restore the image signals g of the RGB domain to output the restored image signals $f_R$. Here, the image restoration filter coefficient f_co of the RGB domain may be the image restoration filter coefficient shown in FIGS. 9A to 9C.

The image restoration device 1240 shown in FIG. 12 may serve as the image restoration device 200 described with reference to FIGS. 2 to 4. Accordingly, since detailed descriptions of the configuration and operation of the image restoration device 1240 have already been made, a detailed description thereof will not be repeated.

The lens 1210 may be disposed between the subject (not shown) and the image sensor 1220 to refract the images of the subject (not shown) to be delivered to the image sensor 1220. The lens 1210 provided in the image restoration system 1200 according to an embodiment of the inventive concept may be an Extended Depth of Field (EDoF) lens.

Figure 13:
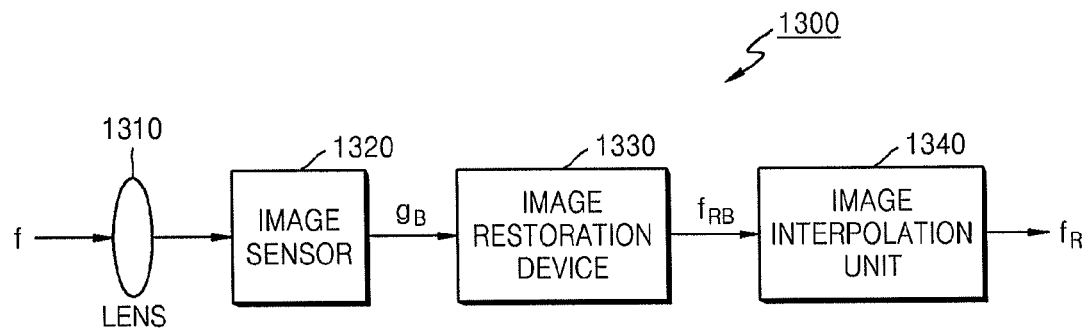
FIG. 13 illustrates a diagram of an image restoration system including an image restoration device, according to another embodiment of the inventive concept.

FIG. 13 is a diagram illustrating an image restoration system 1300 including an image restoration device 1330, according to another embodiment. The image restoration system 1300 may include an image sensor 1320, the image restoration device 1330, and an image interpolation unit 1340. Also, the image restoration system 1300 may further include a lens 1310. The image restoration system 1300 of FIG. 13 may differ from the image restoration system 1200 of FIG. 12 in that the sequence of the image interpolation unit 1340 and the image restoration device 1330 is reversed.

Referring to FIG. 13, the image sensor 1320 may capture images of a subject (not shown) to generate image signals $g_B$, and may output the generated image signals $g_B$ to the image interpolation unit 1340. The image signals $g_B$ output from the image sensor 1320 may have a Bayer pattern.

Here, since the image restoration device 1330 of FIG. 13 may receive the image signals $g_B$ of the Bayer domain output from the image sensor 1320, the filter coefficient generation unit 232 provided in the image restoration device 1330 may generate image restoration filter coefficients f_co of the Bayer domain to output the image restoration filter coefficients f_co to the FIR filter 216. The image restoration device 1330 may restore the image signals $g_B$ of the Bayer domain to output the restored image signals $f_{RB}$. Here, the image restoration filter coefficient f_co of the Bayer domain may be the image restoration filter coefficient shown in FIG. 10, and the restored image signals $f_{RB}$ may be the image signals of the Bayer domain.

The image restoration device 1330 shown in FIG. 13 may serve as the image restoration device 200 described with reference to FIGS. 2 to 4. Accordingly, since detailed descriptions of the configuration and operation of the image restoration device 1330 have already been made, a detailed description thereof will not be repeated herein The image interpolation unit 1340 may perform image interpolation on the restored image signals $f_{RB}$ of the Bayer domain, which are output from the image restoration device 1330, to generate and output the restored image signal $f_R$. Similarly to the lens 1210 shown in FIG. 12, the lens 1310 shown in FIG. 13 may be an EDoF lens.

The image restoration systems 1200 and 1300 according to an embodiment of the inventive concept may be provided in mobile phones, digital still cameras, and camera systems similar thereto.

Figure 14:
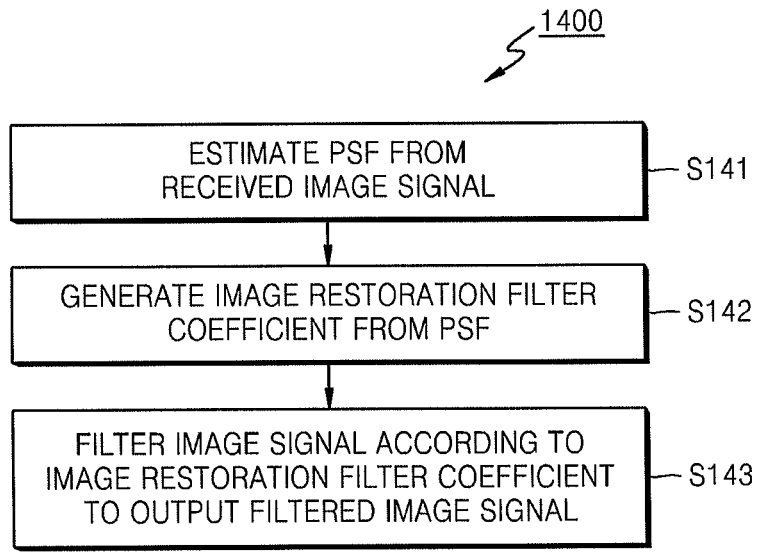
FIG. 14 illustrates a flowchart of an image restoration method according to an embodiment of the inventive concept.

FIG. 14 is a flowchart illustrating an image restoration method 1400 according to an embodiment of the inventive concept. Referring to FIG. 14, the image restoration method 1400 may include receiving an image signal to estimate a PSF from the received image signal (S141), receiving the image signal and the PSF to generate an image restoration filter coefficient (S142), and filtering the image signal according to the image restoration filter coefficient to output the filtered image signal (S143).

Although not shown, the image restoration method 1400 may further include receiving and analyzing the image signal to generate and output a weight value coefficient, calculating a weighted average of the image signal and the filtered image signal according to the weight value coefficient, and outputting the weighted average as a restored image signal.

Figure 15:
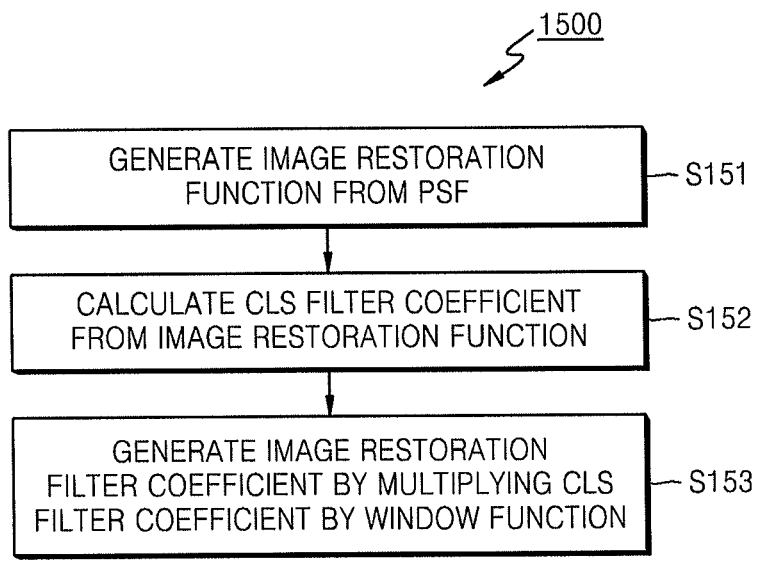
FIG. 15 illustrates a flowchart of generation of an image restoration filter coefficient in an image restoration method according to an embodiment of the inventive concept.

FIG. 15 is a flowchart illustrating generation of an image restoration filter coefficient in an image restoration method, according to an embodiment of the inventive concept. Referring to FIG. 15, the generation of an image restoration filter coefficient may include generating an IRF from a PSF (S151), receiving the IRF and calculating a CLS filter coefficient from the IRF (S152), and multiplying the CLS filter coefficient by a window function to generate the image restoration filter coefficient.

Since the image restoration method shown in FIGS. 14 and 15 is similar to that of the image restoration device described with reference to FIGS. 2 to 4, a detailed description thereof will be omitted herein.

While the inventive concept has been particularly shown and described with reference to exemplary embodiments thereof, it will be understood that various changes in form and details may be made therein without departing from the spirit and scope of the following claims.

What is claimed is:

1. An image restoration device, comprising:
   a Point Spread Function (PSF) estimator to receive an image signal and estimate a PSF from the received image signal; and
   an image restoration filter to receive the image signal and the PSF, generate one or more image restoration filter coefficients from the PSF, and filter the image signal according to the one or more image restoration filter coefficients to output a filtered image signal, wherein the image restoration filter includes:
   an extractor to extract a second number of coefficients from a first number of coefficients of an image restoration function corresponding to the PSF, wherein the one or more image restoration filter coefficients are based on the second number of coefficients and wherein the second number is less than the first number.

2. The image restoration device as claimed in claim 1, wherein the image restoration filter comprises:
   a filter coefficient generator to generate the first number of coefficients from the PSF to output the one or more generated image restoration filter coefficients based on the second number of coefficients.

3. The image restoration device as claimed in claim 2, wherein the filter coefficient generator comprises:
   an image restoration function generator to generate an image restoration function from the PSF,
   wherein the extractor is to receive the image restoration function, a calculate Constrained Least Square (CLS) filter coefficients from the image restoration function, and multiply the CLS filter coefficients by a window function to generate the one or more image restoration filter coefficients, wherein the first number of coefficients corresponds to the CLS filter coefficients and the second number of coefficients is determined based on the multiplication of the CLS filter coefficients and the window function.

4. The image restoration device as claimed in claim 3, wherein the window function comprises one of a rectangular window function, a Gaussian window function, or a raised cosine window function.

5. The image restoration device as claimed in claim 3, wherein the filter coefficient generator comprises a filter coefficient storage unit receiving the one or more image restoration filter coefficients from the filter coefficient extractor and store the one or more image restoration filter coefficients.

6. The image restoration device as claimed in claim 3, wherein the image restoration function generator is to generate the image restoration function R according to the following Equation:

$$R = \frac{H^*}{|H|^2 + \lambda |C|^2}$$

where H represents the PSF, H* represents a complex conjugate of the PSF, λ represents a regularization parameter, and C represents a transfer function of a high pass filter.

7. The image restoration device as claimed in claim 2, further comprising a Finite Impulse Response (FIR) filter to receive the image signal and the one or more image restoration filter coefficients, perform convolution on the image signal and the one or more image restoration filter coefficients and output a convolution result.

8. The image restoration device as claimed in claim 1, further comprising a weight value calculator to receive the image signal, and analyze the image signal to generate and output at least one weight value coefficient.

9. The image restoration device as claimed in claim 8, further comprising an image mixer to receive the image signal, the filtered image signal, and the at least one weight value coefficient, calculate a weighted average of the image signal and the filtered image signal according to the at least one weight value coefficient, and output a restored image signal based on the weighted average.

10. An image restoration method for an image signal, the method comprising:
  estimating a Point Spread Function (PSF) from the image signal;
  generating one or more image restoration filter coefficients from the PSF;
  filtering the image signal according to the one or more image restoration filter coefficients; and
  outputting the filtered image signal, wherein said generating includes:
  extracting a second number of coefficients from a first number of coefficients of an image restoration function corresponding to the PSF, wherein the one or more image restoration filter coefficients are based on the second number of coefficients and wherein the second number is less than the first number.

11. The method as claimed in claim 10, wherein generating the one or more image restoration filter coefficients includes:
  generating an image restoration function from the PSF;
  calculating Constrained Least Square (CLS) filter coefficients from the image restoration function; and
  multiplying the CLS filter coefficients by a window function to generate the one or more image restoration filter coefficients, wherein the first number of coefficients corresponds to the CLS filter coefficients and the second number of coefficients is determined based on the multiplication of the CLS filter coefficients and the window function.

12. The method as claimed in claim 10, wherein filtering the image signal includes:
  Finite Impulse Response filtering the image signal and the one or more image restoration filter coefficients; and
  convolving the image signal and the one or more image restoration filter coefficients.

13. The method as claimed in claim 10, further comprising:
  generating at least one weight value coefficient from the image signal;
  calculating a weighted average of the image signal and the filtered image signal using the at least one weight value coefficient; and
  outputting a restored image signal based on the weighted average.

14. An image restoration system, comprising:
  an image sensor capturing an image of a subject to generate an image signal and outputting the image signal; and
  an image restoration device receiving the image signal from the image sensor and restoring the received image signal to output the restored image signal, wherein the image restoration device includes:
  a PSF estimator to receive the image signal and estimate a PSF from the received image signal; and
  an image restoration filter to receive the image signal and the PSF, generate one or more image restoration filter coefficients from the PSF, and filter the image signal according to the one or more image restoration filter coefficients to output the filtered image signal, wherein the image restoration filter includes:
  an extractor to extract a second number of coefficients from a first number of coefficients of an image restoration function corresponding to the PSF, wherein the one or more image restoration filter coefficients are based on the second number of coefficients and wherein the second number is less than the first number.

15. The image restoration system as claimed in claim 14, wherein the image restoration filter comprises:
  a filter coefficient generator to generate the first number of coefficients from the PSF to output the one or more generated image restoration filter coefficients based on the second number of coefficients.

16. The image restoration system as claimed in claim 15, wherein the filter coefficient generator comprises:
  an image restoration function generator to generate the image restoration function from the PSF; and
  a filter coefficient extractor to receive the image restoration function, calculate Constrained Least Square (CLS) filter coefficients from the image restoration function, and multiply the CLS filter coefficients by a window function to generate the one or more image restoration filter coefficients, wherein the first number of coefficients corresponds to the CLS filter coefficients and the second number of coefficients are determined based on the multiplication of the CLS filter coefficients and the window function.

17. The image restoration system as claimed in claim 16, wherein the window function comprises one of a rectangular window function, a Gaussian window function, or a raised cosine window function.

18. The image restoration system as claimed in claim 15, wherein the image restoration filter comprises:
  a Finite Impulse Response (FIR) filter receiving the image signal and the one or more image restoration filter coefficients, performing convolution on the image signal and the one or more image restoration filter coefficients, and outputting a convolution result.

19. The image restoration system as claimed in claim 14, wherein the image restoration device receives the image signal directly from the image sensor, the system further comprising an image interpolator to perform image interpolation on the restored image signal outputted from the image restoration device and transforming the restored image signal to an RGB domain.

20. The image restoration system as claimed in claim 14, further comprising an image interpolator to perform image interpolation on the image signal, transform the image signal to an RGB domain and output the transformed image signal to the image restoration device as the image signal from the image sensor.

21. The image restoration device as claimed in claim 1, wherein:
  the first number of coefficients corresponds to a first number of pixels of the received image signal, and
  the second number of coefficients corresponds to a second number of pixels of the received image signal, wherein the second number of pixels is less than the first number of pixels.

22. The image restoration device as claimed in claim 21, wherein the first number of pixels corresponds to all pixels of the received image signal.

23. The image restoration device as claimed in claim 21, wherein:
  the second number of coefficients corresponding to the second number of pixels having varying values, and
  a third number of coefficients have substantially a same value, the third number of coefficients corresponding to the first number of coefficients except the second number of coefficients.

24. The image restoration device as claimed in claim 23, wherein:
   the second number of coefficients correspond to a first filter energy, and
   the third number of coefficients have a second filter energy less than the first filter energy.

25. The image restoration device as claimed in claim 24, wherein at least one of the second number of coefficients corresponding to a maximum filter energy.

26. The image restoration device as claimed in claim 21, wherein the second number of coefficients is a subset of the first number of coefficients.

27. The image restoration device as claimed in claim 21, wherein the first number of pixels is less than or equal to 5% of all pixels of the received image signal.

28. The image restoration device as claimed in claim 25, wherein the first number of pixels is less than or equal to 1% of all pixels of the receive image signal.

* * * * *